United States Patent Office 3,153,654
Patented Oct. 20, 1964

3,153,654
3-PYRAZOLIDINONE CARBOXYLIC ACID DERIVATIVES
Geoffrey Ernest Ficken, Ilford, Essex, England, assignor to Ilford Limited, Ilford, Essex, England, a British company
No Drawing. Filed May 7, 1962, Ser. No. 193,005
Claims priority, application Great Britain, May 31, 1961, 19,700/61; Feb. 19, 1962, 6,373/62
14 Claims. (Cl. 260—310)

This invention relates to photographic developers suitable for the development of latent images formed in silver halide photographic emulsions.

In British Patent No. 542,502 there are described photographic developing substances which are 3-pyrazolidones (in more modern nomenclature 3-pyrazolidinones) of the general formula:

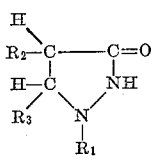

where $R_1$, $R_2$ and $R_3$ are the same or different and are hydrogen atoms, alkyl groups, e.g. methyl, ethyl, propyl, isopropyl or higher alkyl groups, aryl groups, e.g. phenyl and naphthyl groups or aralkyl groups, e.g. benzyl groups. Such hydrocarbon substituent groups may themselves be substituted; for example, aryl groups may be substituted with hydroxy, alkoxy, oxyalkyl, amino, substituted amino, nitro, sulphonic or carboxylic groups or halogen atoms.

It is an object of the present invention to provide, as a new group of 3-pyrazolidinone derivatives of value as photographic developers, compounds of the foregoing general formula in which $R_3$ is a carboxylic acid or carboxylic ester group and the remaining symbols have certain limited values assigned to them. According to the present invention there are provided compounds of the general formula:

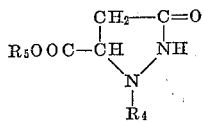

where $R_4$ is an aryl or substituted aryl group, e.g. a phenyl or naphthyl group containing one or more alkyl, alkoxy or halogen substituents, and $R_5$ is hydrogen, a hydrocarbon (preferably alkyl) group, or a hydroxyalkyl group, and salts of those compounds where $R_5$ is hydrogen.

According to a further feature of the invention compounds of the foregoing general formula are prepared by condensing a fumaric or maleic ester of the formula:

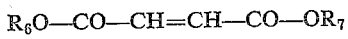

$$R_6O—CO—CH=CH—CO—OR_7$$

where $R_6$ and $R_7$ are the same or different hydrocarbon groups, with an aryl hydrazine in the presence of a strong basic condensing agent, thereby to produce an end product in which $R_5$ is a hydrogen atom, a hydrocarbon group, or a metal atom derived from the basic condensing agent.

The reaction is preferably carried out in anhydrous conditions, and it has been found that the reaction proceeds more easily and completely as the base used is stronger. The best results have been obtained using strong bases such as alkali hydroxides or alkoxides, preferably in equimolecular proportion to the reacting substances, or in excess over that proportion.

When the reaction is effected in the presence of an alkali metal base the product is often obtained in the first instance as the alkali metal salt of the 5-carboxylic acid ($R_5$=hydrogen). The free acid may be obtained by the addition of a strong acid, such as hydrochloric acid, whereupon the less soluble free acid separates from solution. In other cases the group $R_6$ may stay in position so that the product obtained is an ester ($R_6$ becomes $R_5$=hydrocarbon). Furthermore, when the reaction is effected in the presence of an alcohol $R_8OH$ ($R_8$ being an alkyl group) ester interchange may take place so that in the final product the group $R_5$ is the group $R_8$. Compounds in which $R_5$ is hydrocarbon may be made from the corresponding compounds in which $R_5$ is hydrogen, by esterification.

To produce compounds in which $R_5$ is hydroxyalkyl an alkali metal salt of the compounds where $R_5$ is hydrogen may be reacted with a haloalkanol.

The 5-carboxyl-3-pyrazolidinone acid and ester derivatives of this invention are valuable developing agents for photographic silver halide emulsions. For this use they are preferably compounded with alkali, e.g. alkali metal carbonate, and more preferably such compositions also contain hydroquinone. The compositions may further contain an alkali metal sulphite and other ingredients commonly included in photographic developers.

The new compounds appear to have in general somewhat less activity than 1-phenyl-3-pyrazolidinone (which is extensively used commercially), but they have the valuable advantage that, in particular, the sodium salts of the carboxylic acids are very easily soluble in water. Hence they are valuable constituents for powdered developer compositions where it is required that the developer should be made up by dissolving the powder in water.

The following examples will serve to illustrate the invention:

EXAMPLE 1

*3-Oxo-1-Phenylpyrazolidine-5-Carboxylic Acid*

(a) A solution of sodium (13.65 g.) in ethanol (230 ml.) was treated with dry benzene (230 ml.) and phenylhydrazine (45.5 ml.), followed by diethyl maleate (78 g.). After refluxing the mixture for 16 hours as much volatile material as possible was distilled out at 100° and 20 mm. A solution of the residue in water (200 ml.) was acidified with dilute hydrochloric acid, which caused the separation of a brown tar, which was taken up in chloroform. The chloroform solution was extracted with aqueous sodium bicarbonate, and the aqueous solution was cooled and acidified with hydrochloric acid. The precipitated solid was collected and recrystallised from water (with charcoal), and then from a mixture of isopropanol and ethyl acetate to yield 3-oxo-1-phenylpyrazolidine-5-carboxylic acid as colourless needles, M. Pt. 164° C. (decomp.).

(b) Phenylhydrazine (20 ml.) was added to a solution of sodium (9.2 g.) in ethanol (200 ml.), followed by diethyl fumarate (32.4 ml.), and the whole refluxed for 16 hours. The residue remaining after evaporation of the solvent was warmed by water (200 ml.) for 1 hour. Acetic acid (30 ml.) and charcoal were added, and the solution was filtered after cooling. Addition of concentrated hydrochloric acid (50 ml.) to the filtrate caused the separation of a solid, which was purified by dissolving in an aqueous solution of sodium acetate, filtering (charcoal), and re-acidifying the filtrate with hydrochloric acid. The product was crystallised from an isopropanol-ethyl acetate mixture, when it had M. Pt. 164° C. (decomp.), and was identical with the product of (a) above.

EXAMPLE 2

*1-p-Chlorophenyl-3-Oxopyrazolidine-5-Carboxylic Acid*

A solution of sodium (7.6 g.) in ethanol (125 ml. was treated successively with benzene (125 ml.), p-chlorophenylhydrazine (23.5 g.), and diethyl maleate (26.8 ml.), and the mixture was refluxed for 16 hours. The residue remaining after removal of all volatile material at 100° C. and 20 mm. was dissolved in water (180 ml.), and the solution was saturated with carbon dioxide at room temperature. The filtered solution was acidified with hydrochloric acid, and the precipitated solid was collected, dried, and crystallised from ethyl acetate. The resulting 1 - p-chlorophenyl-3-oxo-pyrazolidine-5-carboxylic acid formed buff-coloured crystals, M. Pt. 168–170° C. (decomp.).

EXAMPLE 3

*3-Oxo-1-o-Tolylpyrazolidine-5-Carboxylic Acid*

A solution of sodium (6.9 g.) in ethanol (150 ml.) was refluxed for 17 hours with o-tolylhydrazine hydrochloride (15.9 g.) and diethyl maleate (16.2 ml.). The residue remaining after evaporation of volatile material at 100° C. and 20 mm. was dissolved in water (100 ml.) and the solution was saturated with carbon dioxide at room temperature. The filtered solution was acidified with hydrochloric acid, and the solid which separated was purified by dissolving in a warm solution of crystalline sodium acetate (10 g.), cooling and reacidifying (hydrochloric acid). The product was crystallised from a mixture of ethanol and water to give 3-oxo-1-o-tolylpyrazolidine-5-carboxylic acid as buff crystals, M. Pt. 228–230° C. (decomp.).

EXAMPLE 4

*Isopropyl 3-Oxo-1-Phenylpyrazolidine-5-Carboxylate*

Phenylhydrazine (20 ml.) and diethyl maleate (32.4 ml.) were added to a solution of sodium (6.0 g.) in isopropanol (100 ml.), and the mixture was refluxed for 16 hours. The solvent was removed by distillation under reduced pressure, and the residue was treated with ice and concentrated hydrochloric acid (30 ml.). The oil which separated was taken up in chloroform, and the chloroform solution was washed several times with aqueous sodium carbonate, and then distilled. The fraction of B. Pt. 204–212°/7 mm. solidified on cooling, and the solid was crystallised from a mixture of benzene and light petroleum (B. Pt. 60–80°) to yield isopropyl 3-oxo-1-phenylpyrazolidine - 5-carboxylate as colourless plates, M. Pt. 95–97° C.

EXAMPLE 5

*Ethyl 3-Oxo-1-Phenylpyrazolidine-5-Carboxylate*

A solution of 3-oxo-1-phenylpyrazolidine-5-carboxylic acid (9.2 g.) in ethanol (40 ml.) was refluxed for 17 hours with concentrated sulphuric acid (0.5 ml.). The resulting solution was poured into dilute aqueous sodium bicarbonate solution, and the solid which separated was collected and crystallised from a mixture of benzene and light petroleum (B. Pt. 60–80°). Ethyl 3-oxo-1-phenylpyrazolidine - 5 - carboxylate formed colourless prisms, M. Pt. 108–110° C.

EXAMPLE 6

*1-p-Methoxyphenyl-3-Oxopyrazolidine-5-Carboxylic Acid*

A solution of sodium (4.6 g.) in ethanol (80 ml.) was treated successively with p-methoxyphenylhydrazine (13.8 g.) and diethyl maleate (16.2 ml.). After refluxing the solution for 16 hours as much volatile material as possible was removed under reduced pressure, and the residue was warmed on the steam-bath for 1 hour with water (150 ml.). The cooled solution was made slightly acid with acetic acid, treated with charcoal and filtered. The filtrate was treated with concentrated hydrochloric acid (30 ml.), decanted from a little tar and exhaustively extracted with chloroform. The extracts on evaporation gave the pyrazolidine-carboxylic acid, which formed colourless needles, M. Pt. 144–146° C. (decomp.), by crystallisation from ethyl acetate.

EXAMPLE 7

*3-Oxo-1-p-Tolylpyrazolidine-5-Carboxylic Acid* p-Tolylhydrazine (24.4 g.) was added to a solution of sodium (9.2 g.) in ethanol (200 ml.), followed by diethyl maleate (32.4 ml.) and the solution was refluxed for 16 hours. The residue remaining after distillation of the solvent was warmed with water (150 ml.) for 1 hour, acetic acid (30 ml.) was added, and the mixture was filtered after cooling and the addition of charcoal. The solid which separated on addition of concentrated hydrochloric acid (90 ml.) to the filtrate was purified by dissolving in a warm solution of sodium acetate, re-filtering, cooling and re-acidifying with hydrochloric acid. The product was recrystallised from water to yield 3-oxo-1-p-tolylpyrazolidine - 5 - carboxylic acid as cream-coloured needles, M. Pt. 157–158° C. (decomp.).

By a similar method was prepared:

EXAMPLE 8

*1-p-Bromo-3-Oxopyrazolidine-5-Carboxylic Acid*

The pyrazolidine-5-carboxylic acid formed cream-coloured crystals, M. Pt. 165° C. (decomp.), by crystallisation from water.

EXAMPLE 9

*Methyl 3-Oxo-1-Phenylpyrazolidine-5-Carboxylate*

A mixture of 3-oxo-1-phenylpyrazolidine-5-carboxylic acid (10 g.), methanol (40 ml.) and concentrated sulphuric acid (1.0 ml.) was refluxed for 17 hours, and the resulting solution was poured into water (200 ml.). The oil which separated was taken up in chloroform, and the chloroform solution was washed with saturated sodium bicarbonate solution. Removal of the solvent from the dried (sodium sulphate) solution left an oil which solidified on cooling. Crystallisataion from benzene gave methyl 3-oxo-1-phenylpyrazolidine-5-carboxylate as colourless plates, M. Pt. 86–87° C.

EXAMPLE 10

*2-Hydroxyethyl 3-Oxo-1-Phenylpyrazolidine-5-Carboxylate*

A mixture of 3-oxo-1-phenylpyrazolidine-5-carboxylic acid (5.0 g.), sodium carbonate (anhydrous, 5.0 g.) and 2-chloroethanol (25 ml.) was heated for 2½ hours at 150–160° C. under reflux. As much of the excess chloroethanol as possible was distilled off under reduced pressure, and the residue was treated with water (50 ml.) and acetic acid (5.0 ml.). The oil was separated, the aqueous solution was extracted four times with ethyl acetate, and the combined oil and extracts were dried ($Na_2SO_4$). The solid remaining after removal of the solvent was crystallised from ethanol, when the hydroxyethyl ester was obtained as colourless plates, M. Pt. 157–158° C.

EXAMPLE 11

*1-o-Chlorophenyl-3-Oxopyrazolidine-5-Carboxylic Acid*

A solution of sodium (7.3 g.) in ethanol (160 ml.) was treated successively with o-chlorophenylhydrazine (22.6 g.) and diethyl maleate (25.8 ml.), and the mixture was refluxed for 18 hours. After removal of the solvent, the residue was warmed with water (100 ml.) for 1 hour, cooled, and acidified with acetic acid (25 ml.). The solid which separated was filtered off, and the filtrate was treated with concentrated hydrochloric acid. The tar which separated was warmed with a solution of sodium acetate crystals (40 g.) in water (200 ml.) and the solution was filtered (charcoal). Addition of concentrated hydrochloric acid (35 ml.) to the filtrate caused the separation of 1-o-chlorophenyl-3-oxopyrazolidine-5-carboxylic acid, which was obtained as cream-coloured plates, M. Pt. 228° C. (decomp.), by crystallisation from water.

EXAMPLE 12

*1-(3,4-Dichlorophenyl)-3-Oxopyrazolidine-5-Carboxylic Acid*

3,4-dichlorophenylhydrazine (17.7 g.) and diethyl maleate (16.2 g.) were added to a solution of sodium (4.6 g.) in ethanol (100 ml.). After refluxing the solution for 17 hours, the solvent was, distilled off, and the residue was warmed with water (75 ml.) for 1 hour. Acetic acid (15 ml.) and charcoal were added and the mixture was filtered. Addition of concentrated hydrochloric acid (25 ml.) to the cooled filtrate caused the separation of a solid, which was crystallised from ethyl acetate to yield 1-(3,4-dichlorophenyl)-3-oxopyrazolidine-5-carboxylic acid as colourless needles, M.Pt. 177° C. (decomp.) by crystallisation from ethyl acetate.

EXAMPLE 13

*1-α-Naphthyl-3-Oxopyrazolidine-5-Carboxylic Acid*

α-Naphthylhydrazine hydrochloride (10.3 g.) and diethyl maleate (8.6 g.) were added to a solution of sodium (3.7 g.) in ethanol (100 ml.) and the whole refluxed for 16½ hours. As much as possible of the solvent was distilled off, and the residue was warmed for 1½ hours with water (100 ml.). The cooled solution was acidified with acetic acid and filtered (charcoal). Addition of concentrated hydrochloric acid to the filtrate caused the separation of a solid; this was purified by dissolving in a solution of crystalline sodium acetate (10 g.) in water (100 ml.), and re-acidification of the filtered solution with concentrated hydrochloric acid (10 ml.) The precipitated solid was collected, dried, and crystallised from a mixture of ethyl acetate and benzene, to yield 1-α-naphthyl-3-oxopyrazolidine-5-carboxylic acid as colourless needles, M.Pt. 193–195° C. (decomp.).

EXAMPLE 14

The following is exemplary of a developer composition according to the invention:

|  | G. |
| --- | --- |
| 3-oxo-1-phenylpyrazolidine-5-carboxylic acid | 0.25 |
| Sodium sulphite (anhydrous) | 75.0 |
| Hydroquinone | 8.0 |
| Sodium carbonate (anhydrous) | 37.5 |
| Potassium bromide | 2.0 |
| Water to make 1000 ml. | |

For use, one part of this solution is diluted with 2 parts of water.

What I claim is:
1. A 3-pyrazolidinone derivative of the formula:

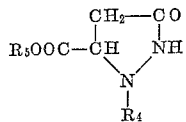

where $R_4$ is selected from the class consisting of phenyl, naphthyl, substituted-phenyl and substituted-naphthyl wherein the substituents are selected from the group consisting of lower alkyl, lower alkoxy and halogen, and $R_5$ is selected from the class consisting of hydrogen, lower alkyl and lower hydroxyalkyl.

2. 3-oxo-1-phenylpyrazolidine-5-carboxylic acid.
3. 1-p-chlorophenyl-3-oxopyrazolidine - 5 - carboxylic acid.
4. 3-oxo-1-o-tolylpyrazolidine-5-carboxylic acid.
5. Isopropyl 3-oxo-1-phenylpyrazolidine-5-carboxylate.
6. Ethyl 3-oxo-1-phenylpyrazolidine-5-carboxylate.
7. 1 - p-methoxyphenyl-3-oxopyrazolidine-5-carboxylic acid.
8. 3-oxo-1-p-tolylpyrazolidine-5-carboxylic acid.
9. 1-p-bromo-3-oxopyrazolidine-5-carboxylic acid.
10. Methyl 3-oxo-1-phenylpyrazolidine-5-carboxylate.
11. 2 - hydroxyethyl 3-oxo-1-phenylpyrazolidine-5-carboxylate.
12. 1-o-chlorophenyl-3-oxopyrazolidine - 5 - carboxylic acid.
13. 1-(3,4-dichlorophenyl) - 3 - oxopyrazolidine-5-carboxylic acid.
14. 1-α-naphthyl-3-oxopyrazolidine-5-carboxylic acid.

References Cited in the file of this patent
UNITED STATES PATENTS

| 2,289,367 | Kendall | July 14, 1942 |
| 2,688,024 | Kendall et al. | Aug. 31, 1954 |
| 2,700,670 | Hafliger | Jan. 25, 1955 |
| 2,743,279 | Reynolds et al. | Apr. 24, 1956 |
| 2,772,282 | Allen et al. | Nov. 27, 1956 |
| 2,784,086 | Henn | Mar. 5, 1957 |
| 2,840,471 | Berry | June 24, 1958 |

OTHER REFERENCES

Fueg: Journal für Praktische Chemie, vol. 182 (vol. 74 of new series), pages 307–12 (1906).

Byrkit et al.: Industrial and Engineering Chemistry, vol. 42, No. 9, pages 1862–1875 (1950).

Migrdichian: Organic Synthesis, vol. 1, pages 311–12, 326–27, N.Y., Reinhold, 1957.